(12) United States Patent
Honda et al.

(10) Patent No.: US 7,826,679 B2
(45) Date of Patent: Nov. 2, 2010

(54) IMAGE READING APPARATUS

(75) Inventors: Keiji Honda, Kahoku (JP); Shinobu Yamamoto, Kahoku (JP); Masahiko Kobako, Kahoku (JP); Kiyoto Kosaka, Kahoku (JP)

(73) Assignee: PFU Limited, Ishikawa (JP)

( * ) Notice: Subject to any disclaimer, the term of this patent is extended or adjusted under 35 U.S.C. 154(b) by 1138 days.

(21) Appl. No.: 11/490,026

(22) Filed: Jul. 21, 2006

(65) Prior Publication Data
US 2007/0065037 A1    Mar. 22, 2007

(30) Foreign Application Priority Data
Sep. 21, 2005   (JP) .................... P2005-273033

(51) Int. Cl.
    *G06K 9/40*    (2006.01)
    *H04N 1/409*   (2006.01)
(52) U.S. Cl. ..................... 382/274; 358/3.27
(58) Field of Classification Search ................. 382/199, 382/274, 312, 315, 318, 325; 358/3.27
See application file for complete search history.

(56) References Cited

U.S. PATENT DOCUMENTS 5,568,573 A * 10/1996 Wada et al. ............... 382/317
5,748,344 A * 5/1998 Rees ........................ 358/505
5,818,062 A * 10/1998 Baba et al. ............. 250/559.36
6,930,804 B2 * 8/2005 Farrell ...................... 358/474
7,215,446 B2 * 5/2007 Ohkawa .................... 358/452

FOREIGN PATENT DOCUMENTS

| | | |
|---|---|---|
| JP | 10-145556 | 5/1998 |
| JP | 10-341332 | 12/1998 |
| JP | 2002-300367 | 10/2002 |

OTHER PUBLICATIONS

Japanese Office Action issued on Feb. 16, 2010 in the corresponding Japanese Patent Application No. 2005-273033.

* cited by examiner

*Primary Examiner*—Bhavesh M Mehta
*Assistant Examiner*—Stephen R Koziol

(57) ABSTRACT

An image reading apparatus includes an image reader, operable to read an image corresponding to an original and a back pad, the original being placed on the back pad so that outside of the original contains an area extending in overall width of the back pad; a first data generator, operable to generate first image data based on the image; a second data generator, operable to generate second image data based on a part of the image corresponding to the area; a first processor, operable to compare the first image data with the second image data so as to generate first edge information; and a detector, operable to detect an edge of the original based on the first edge information.

9 Claims, 10 Drawing Sheets

IMAGE READING APPARATUS

BACKGROUND OF THE INVENTION

The present invention relates to an image reading apparatus, and in particular to an image reading apparatus capable of correctly extracting an image which has any tone without using a special back pad for inclination correction or extraction of an image.

A related image reading apparatus must read a white reference in order to perform white correction or shading correction. For this purpose, the white reference is set by using a back pad having a white color for an original and reading the white color of the back pad.

Actually, the white color of the back pad does not have a constant gradation but has a gradation characteristic varying in vertical direction as shown in FIG. 1.

In case an edge of an original is extracted based on a variation amount of contrast difference between the original and the back pad per pixel in a line in the main scan direction as in a related edge detection method, setting a too small value as the threshold of the variation amount for determining the edge, a part that is not the edge is determined as the edge. Setting a large value as the threshold, the edge cannot be detected in case the background in the original is white and the contrast difference is a small.

For example, referring to FIG. 1, assuming that the variation amount of the contrast difference to be determined as an edge is 5-step gradation, the area corresponding to 296 and 297 pixels is erroneously determined as the edge although it is actually the back pad. Assuming that that the variation amount of the contrast difference to be determined as an edge is 10-step gradation, in case the contrast difference between the white background in the original and the white color of the back pad is small, for example, difference of 9-step gradation, the edge detection for the original is not performed.

In order to solve such a problem, a device has been conceived that includes a mechanism to switch between a white back pad and a black back pad and that uses the white back pad in reading a white reference and using the black back pad in reading an original thus increasing the contrast difference between the background color in the original and the color of the back pad, thereby correctly extracting the image of the original (for example, JP-A-2002-300367).

Such a device must be equipped with a mechanism to switch over the color of the back pad. This adds to the size of the device or complicates the mechanism or control.

SUMMARY

It is therefore an object of the invention to provide an image reading apparatus capable of correctly performing extraction or inclination correction of an original even in case the color of a back pad is white, without a special structure to the original back pad mechanism.

In order to achieve the object, according to the invention, there is provided an image reading apparatus comprising:

an image reader, operable to read an image corresponding to an original and a back pad, the original being placed on the back pad so that outside of the original contains an area extending in overall width of the back pad;

a first data generator, operable to generate first image data based on the image;

a second data generator, operable to generate second image data based on a part of the image corresponding to the area;

a first processor, operable to compare the first image data with the second image data so as to generate first edge information; and a detector, operable to detect an edge of the original based on the first edge information.

With this configuration, it is possible to obtain the difference while considering the gradation characteristic of the back pad, unlike the simple method for detecting a variation point in pursuit of a contrast difference in the main scan direction. It is thus possible to detect a part different from the back pad even in case the color of a background in the original is close to the color of the back pad, thus correctly performing edge detection of the original.

The image reading apparatus may further include a second processor, operable to perform image processing to the image so as to clarify contrast difference between the original and the back pad.

In this case, it is possible to detect the boundary between the back pad and the original by emphasizing a small contrast difference even in case the color of the background in the original is close to the color of the back pad, thus performing edge detection more correctly.

The image reading apparatus may further include a feeder, operable to feed the original; a mechanical sensor, operable to be brought in contact with the fed original so as to detect the edge of the original; and a second processor, operable to generate second edge information based on the edge detected by the mechanical sensor. The detector may detect the edge of the original based on the first and second edge information.

In this case, the position of the top and bottom ends of an original are detected by way of a mechanical sensor used for feed control, thus performing edge detection by using the information therefrom.

The image may correspond to both sides of the original which are simultaneously read by the image reader, the first edge information may include second edge information associated with one of the both sides of the original and third edge information associated with the other one of the both sides of the original, and the detector may detect the edge of the original based on at least one of the first edge information and the second edge information.

In a case that edge detection of the original is not performed in one of the front and rear surfaces of the original, if the edge detection is performed in the other one of the surface, it is possible to extract the edge of the original by calculating image information from the detection-successful surface.

The image reading apparatus may further include a second processor, operable to detect the most reliable side in the edge of the original including four sides, and to verify the edge of the original detected by the first detector based on the most reliable side so as to generate verification information; and a third processor, operable to determine whether the edge of the original is reliable based on the verification information. In a case where the edge of the original is not reliable, image processing may be not performed to the image.

In this case, the apparatus prevents a case where the user inadvertently deletes part of the essential overall view information following failure to detect the edge of the original thus making it impossible to restore the overall information on the image at a later time.

In order to achieve the object, according to the invention, there is also provided an image reading apparatus comprising:

an image reader, operable to read an image including a first image corresponding to a first area in which an original is disposed and a second image different from the first image;

a generator, operable to generate first image data based on the image and second image data based on the second image; and a detector, operable to detect an edge of the original based on the first image data and the second image data.

The image reading apparatus may further include a processor, operable to decide whether the first area contains whole of the original. In a case where the first area does not contain the whole of the original, a user may be notified of an error with a message.

In order to achieve the object, according to the invention, there is also provided a method of detecting an edge of an original placed on a back pad, the method comprising:

reading an image corresponding to the original and the background, the original being placed on the back pad so that outside of the original contains an area extending in overall width of the back pad;

generating first image data based on the image;

generating second image data based on a part of the image corresponding to the area;

comparing the first image data with the second image data so as to generate edge information; and detecting the edge of the original based on the edge information.

DETAIL DESCRIPTION OF PREFERRED EMBODIMENTS

A representative embodiment of the invention will be described with reference to drawings. In the following description, the same parts are given the same signs and corresponding details may be omitted.

It is understood that a gradation characteristic showing a line varying in a vertical direction in one line in a main scan direction of a back pad shows a similar gradation characteristic in a sub scan direction as long as the vertical position remains the same.

Figure 1:
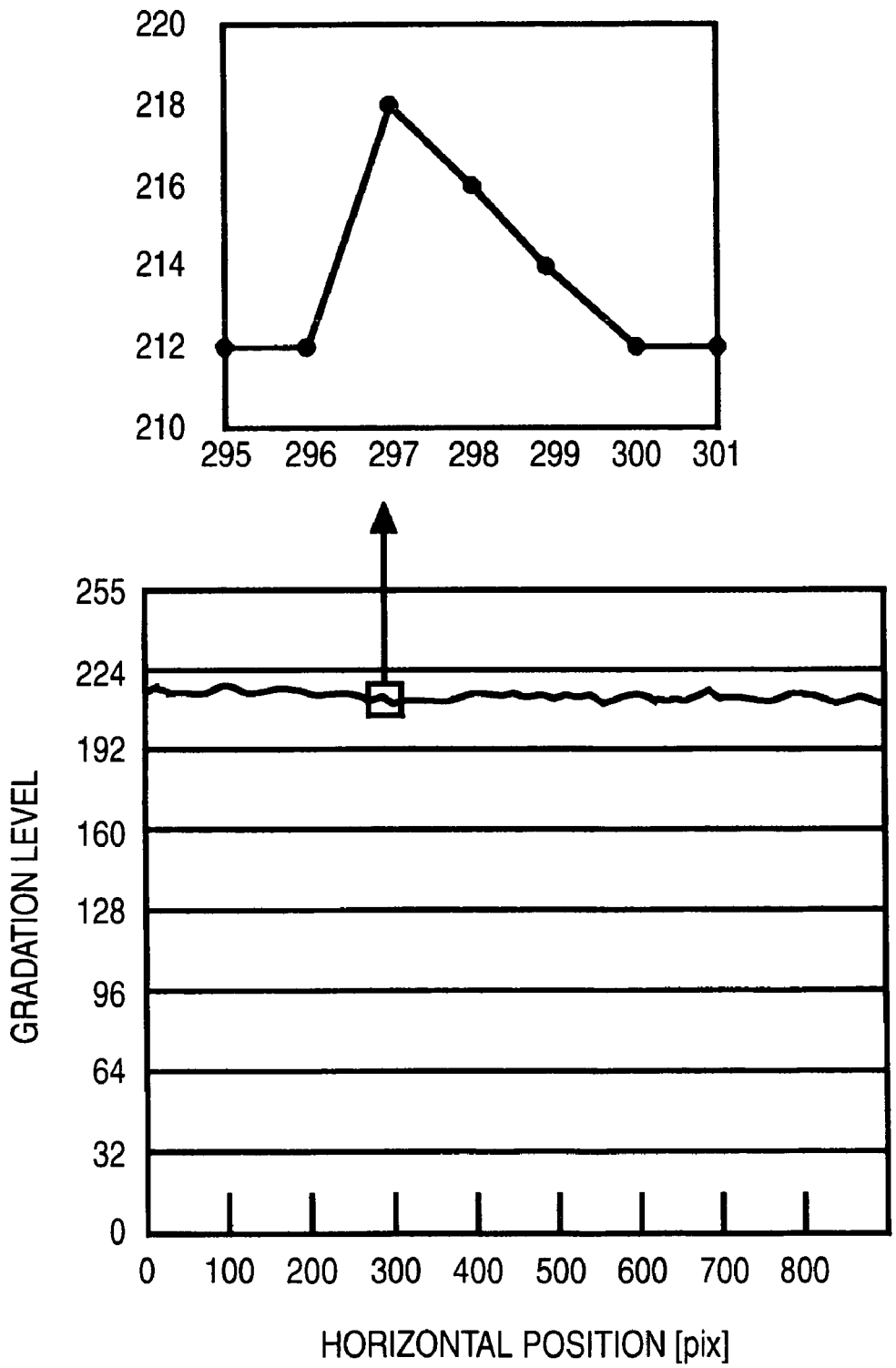
FIG. 1 is an explanatory drawing of the gradation characteristic of a back pad.
Figure 2:
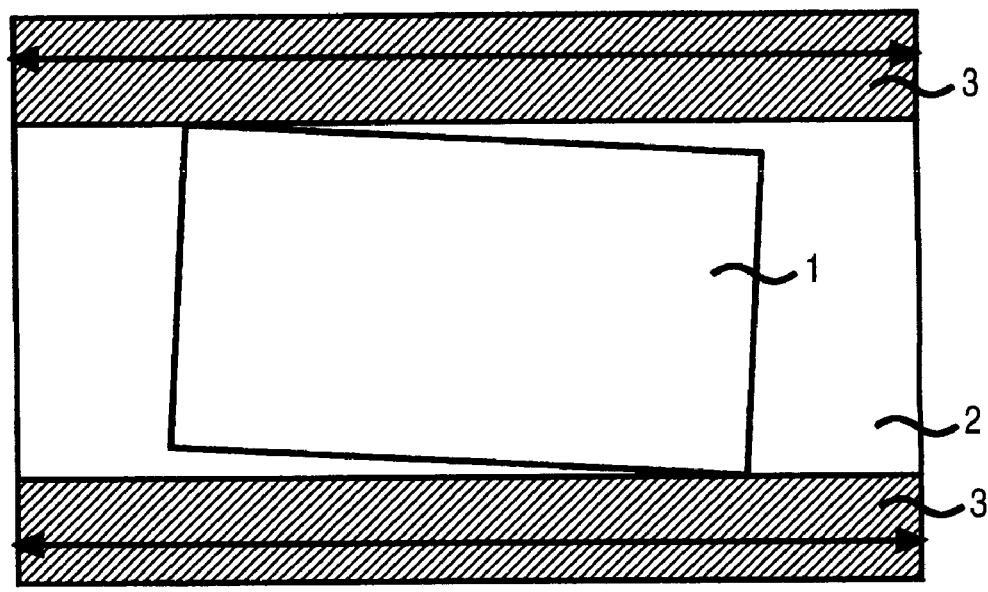
FIG. 2 is an explanatory drawing of an area whose overall width is a back pad.

An image reading apparatus reads an image by an image reader so that a reference data area 3 that is an area where the overall width of the image is a back pad 2 as shown in FIG. 2 is located above the top end or below the bottom end of an original 1. An image data generator generates image data based on the read image and stores the image data in a storage.

A reference data generator generates reference data from the image data obtained by reading part of the reference data area 3 across the overall width and stores the reference data in the storage.

Figure 3:
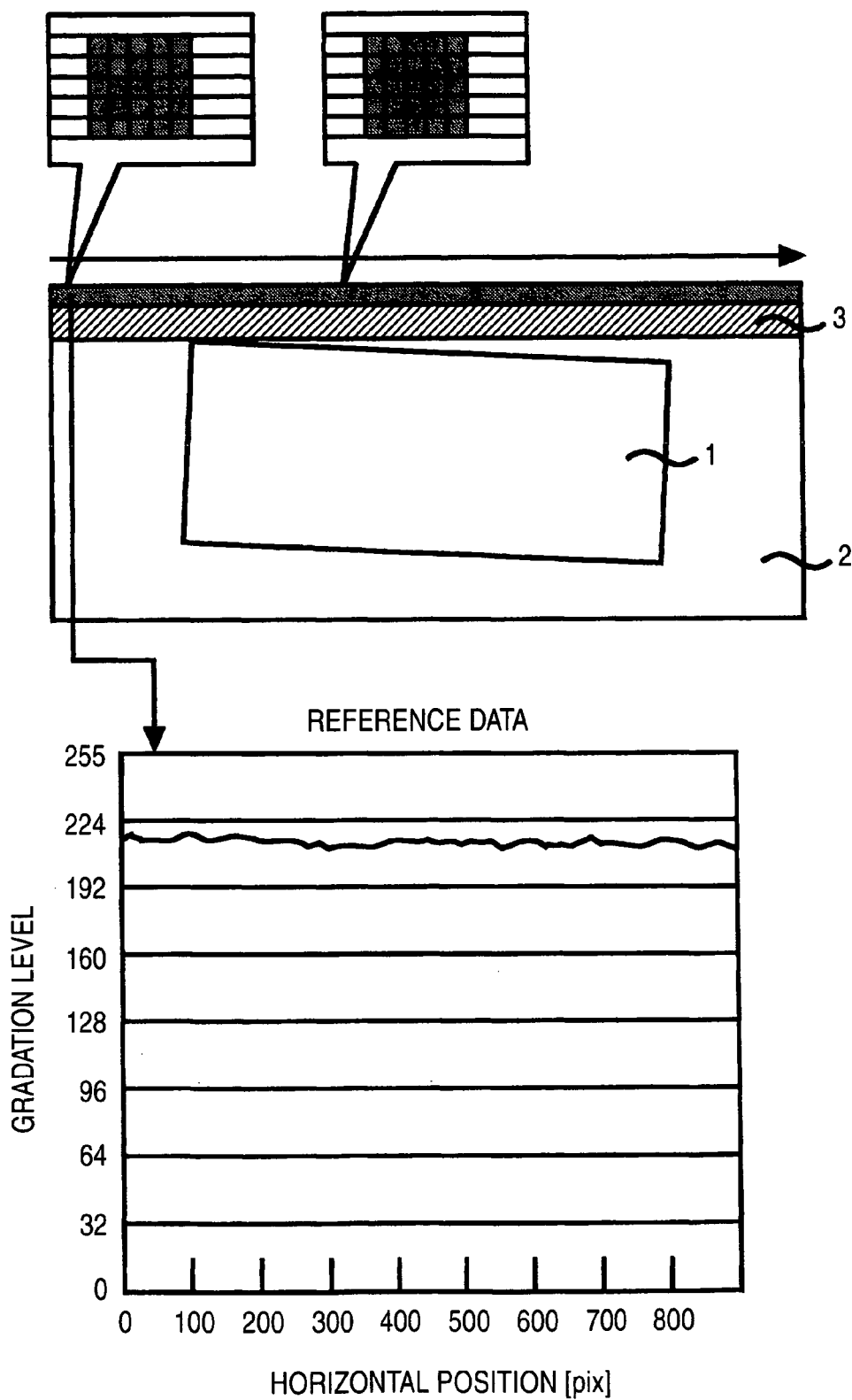
FIG. 3 is an explanatory drawing of the reference data generation processing.

For example, as shown in FIG. 3, the average value of the gradation values of pixels in the 5 by 5 pixels that is part of the reference data area 3 is calculated, and the reference data of the center pixel position is generated. The average value of such a matrix is calculated across the overall width while shifting the center pixel position by one pixel. In this way, it is made possible to generate the reference data that is a gradation characteristic in the main scan direction of the back pad.

In this practice, control is made so that the brightness of illumination to be illuminated on the original will not be too high as to be saturated at a reference value of 255-step gradation or will not be too low to be filled at a reference value of 0-step gradation.

Figure 4:
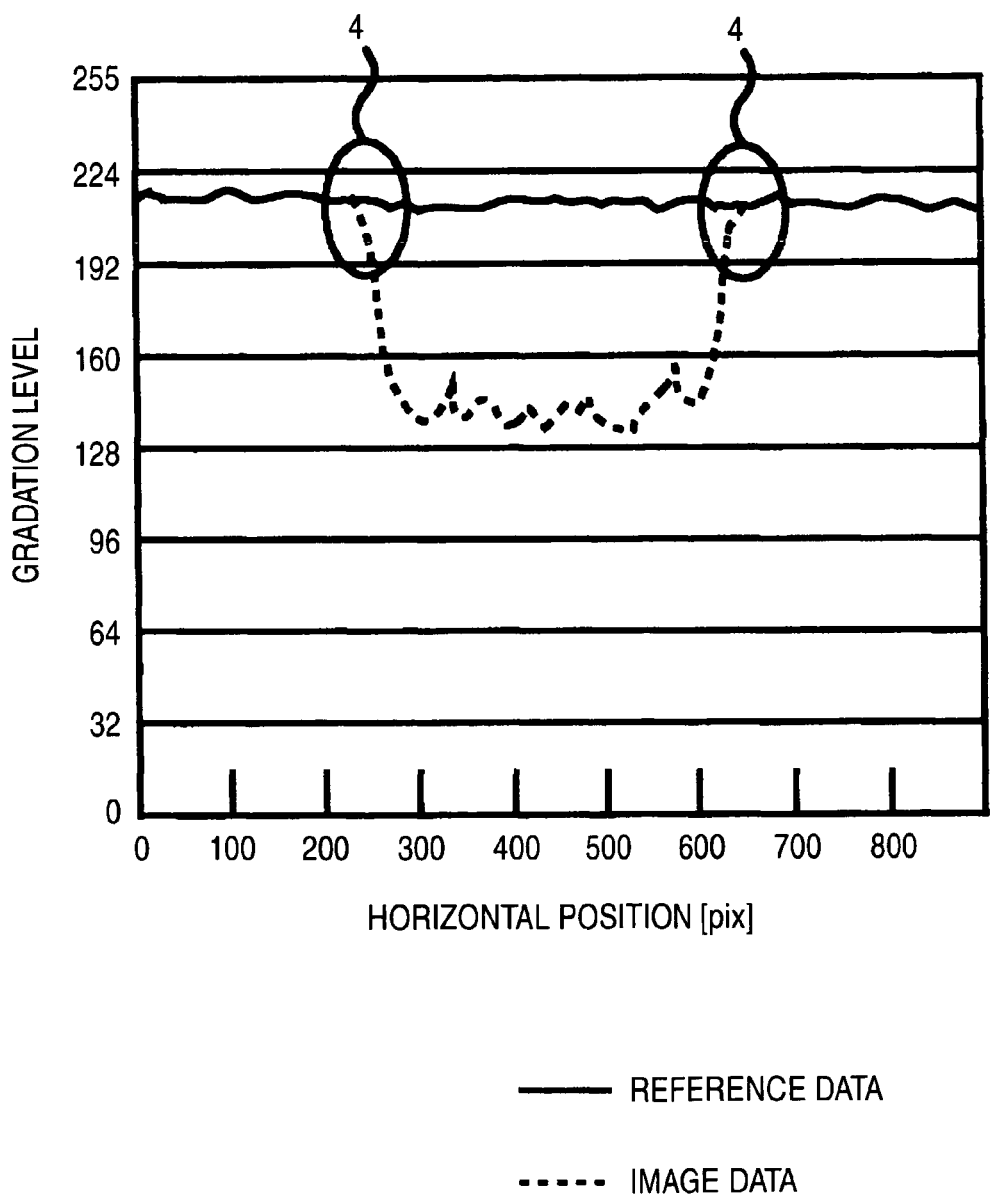
FIG. 4 is an explanatory drawing of an edge detection method.

As shown in FIG. 4, a reference data comparer compares pixel by pixel the difference between the reference data represented in solid lines and the image data represented in dotted lines to detect a variation point 4 where the difference exceeds a predetermined threshold and determine the variation point 4 as an edge of an original image. Here, the image data that is compared with the reference data is calculated as the matrix average value of the gradation values of predetermined pixels.

However, the image data and the reference data is calculated as the matrix average of the gradation values of pixels in the data comparison of them, raw data and the other statistical data, such as standard deviation and variance, instead of the matrix average.

The comparison between the reference data and the image data is performed in the main scan direction (a horizontal direction), and the data comparison in the horizontal direction is performed across a predetermined number of times (lines) in the sub scan direction (a vertical direction). Therefore, the data comparison in the horizontal direction is performed from alternatively right and left directions while shifting in the vertical direction. The edge detection in the horizontal direction is performed by this data comparison. In addition, the data comparison in the vertical direction may be performed in the vertical direction in the same manner. In this case, since the number of data for detecting the edges is increased, the edge detection is performed more correctly. Thus, four sides of the original image are detected and the original image is automatically recognized.

Figure 5:
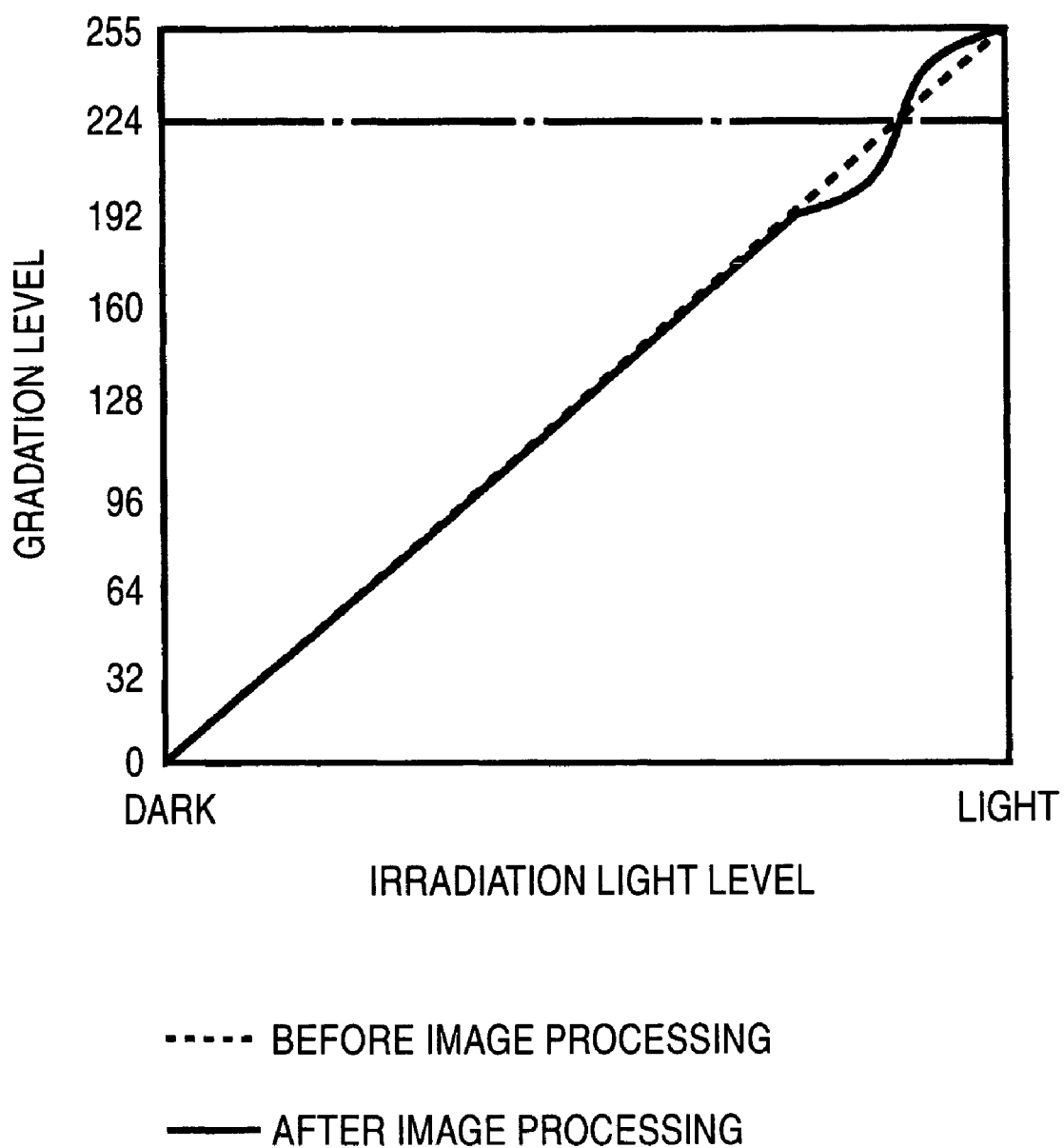
FIG. 5 is an explanatory drawing of image processing means.

As shown in FIG. 5, in case the reference data of the back pad 2 is 224-step gradation, image conversion (image processing) is made based on a tone curve by an image processor so as to emphasize (clarify) a variation of the gradation in the periphery of the 224-step gradation, thus performing edge detection more correctly even in case the difference between the image data and the reference data is small.

Figure 6A:
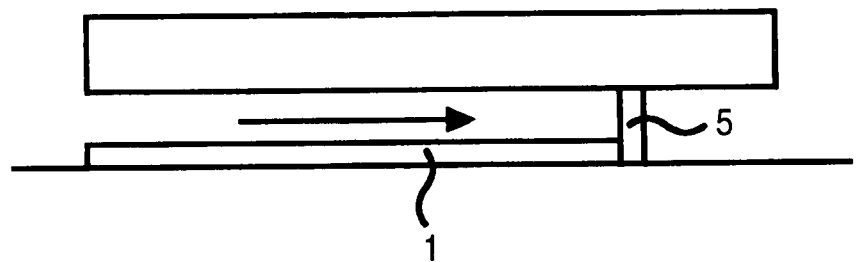
FIGS. 6A to 6C are explanatory drawings of a mechanical sensor for paper feed control.
Figure 6B:
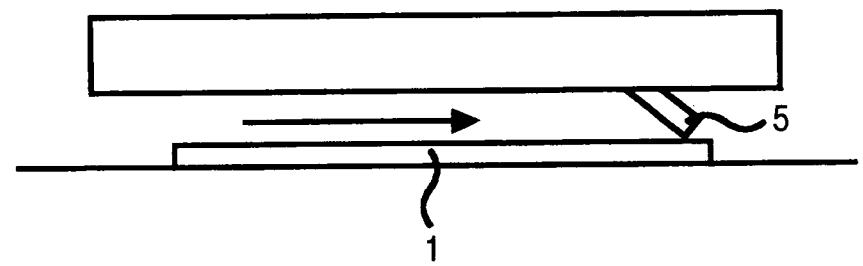
Figure 6C:
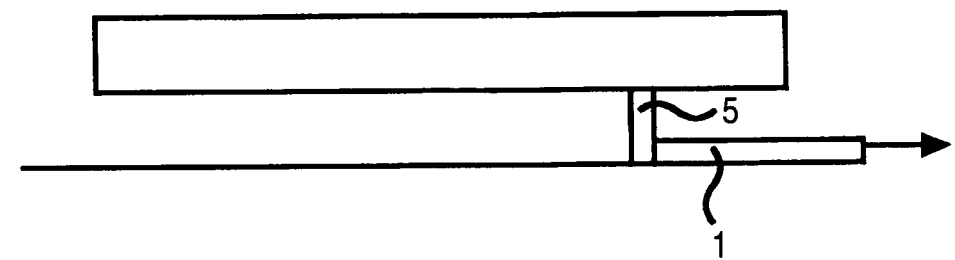

An image reading apparatus including an automatic paper feeder is equipped with a mechanical sensor 5 for paper feed control shown in FIG. 6. When an original 1 is transported by a paper feed mechanism (not shown), the top end of the original 1 comes in contact with the sensor as shown in FIG. 6A. The original 1 is further transported as shown in FIG. 6B, so that the original 1 tilts the mechanical sensor 5, thus detecting the top end of the original 1. The original 1 is further transported as shown in FIG. 6C, the original 1 brings the mechanical sensor 5 to the initial position, thus detecting the bottom end of the original 1.

Figure 7:
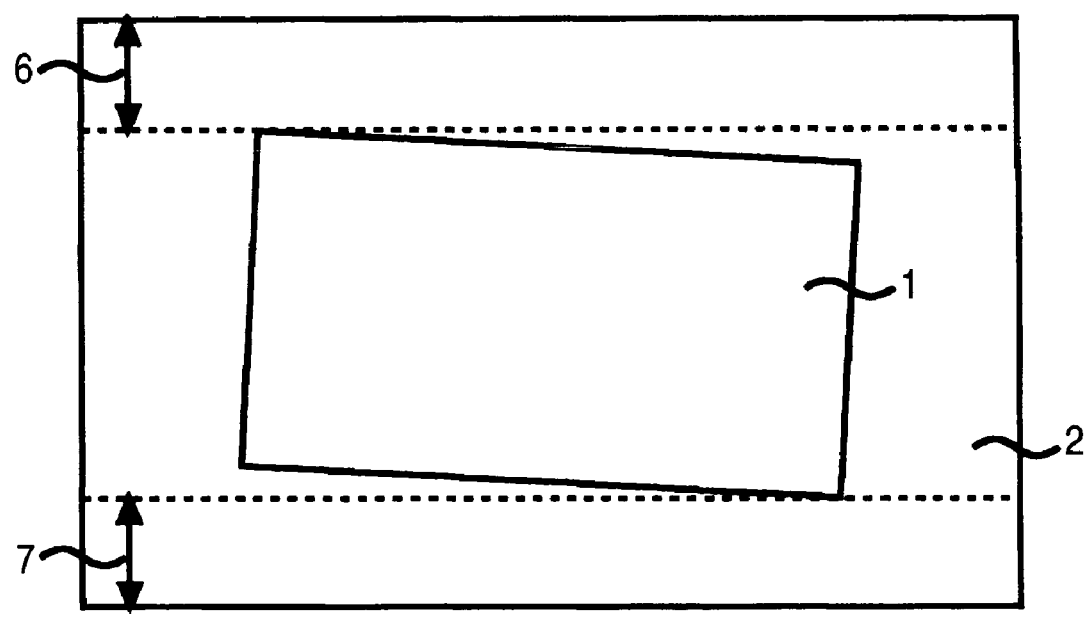
FIG. 7 is an explanatory drawing of edge detection using the mechanical sensor.

As indicated by dotted lines and arrows shown in FIG. 7, a top end overscan amount 6 and a bottom end overscan amount 7 are values obtained from the transfer speed of the paper feed mechanism for the original 1 which is determined by the mechanical sensor 5 and a timing of starting to read the image by the image reader. In other words, such values are known as design values for the image reading apparatus. In case the top side or bottom side of the original 1 cannot be detected, these design values and the detection result (angle) of the left side or right side may be used to calculate the side that cannot be detected.

Figure 8A:
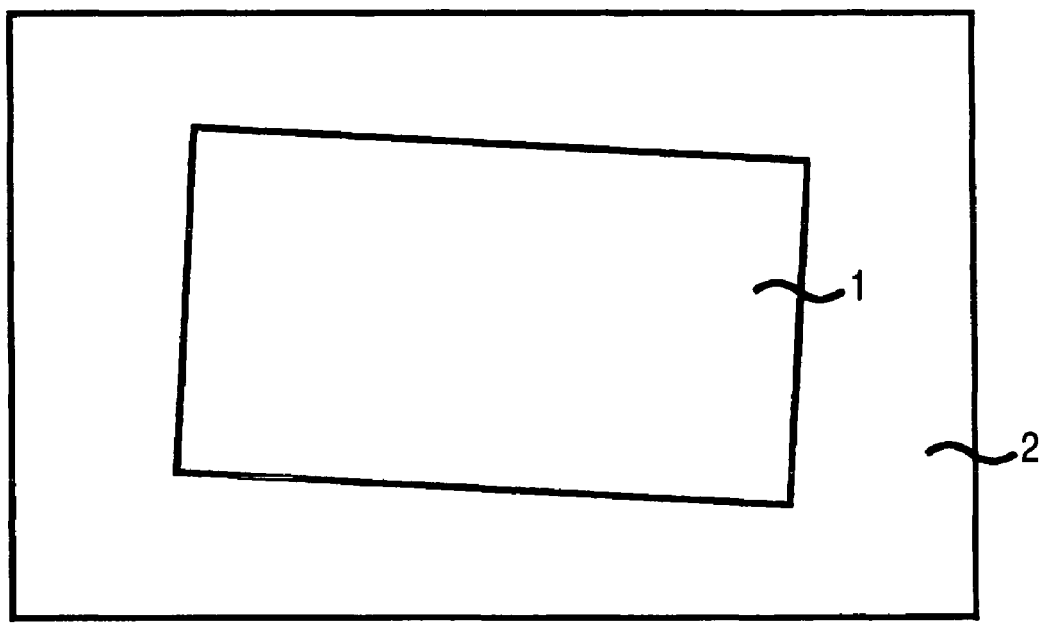
FIGS. 8A and 8B are explanatory drawings of processing assumed in case both surfaces are simultaneously read.
Figure 8B:
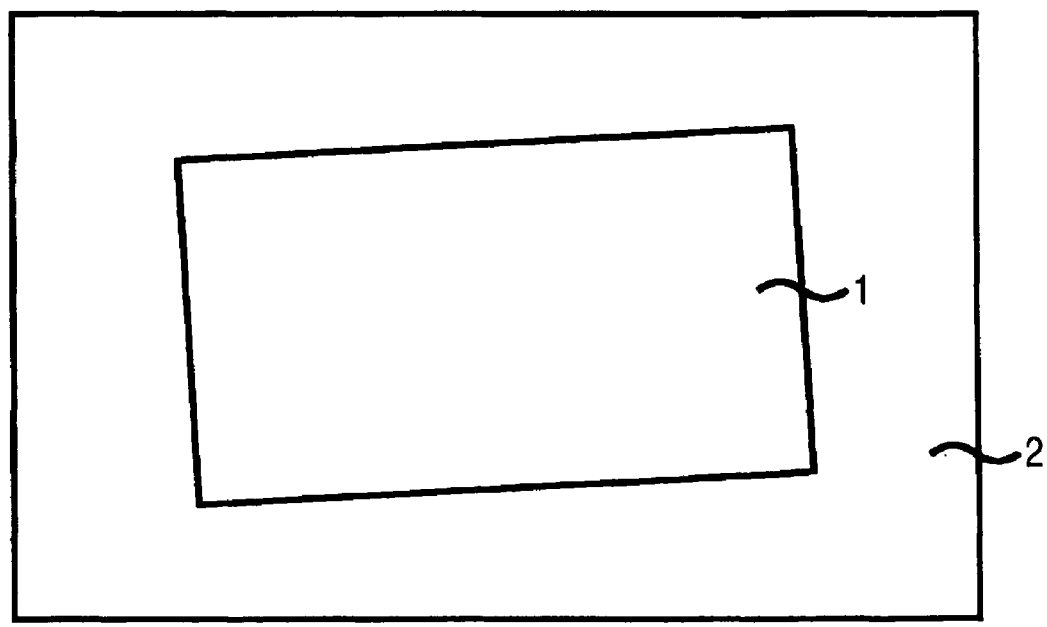

In the case of an image reading apparatus including two image reader opposed to each other and displaced each other in a direction in which the original 1 is transported that simultaneously reads the front and rear surfaces of the original 1, each read image include the original 1 having edges horizontally inverted from each other. For example, even in case edge detection on the surface of the original 1 shown in FIG. 8A has failed, it is possible to calculate the edges on the surface of the original 1 shown in FIG. 8A as long as edge detection on the other surface of the original 1 shown in FIG. 8B is successful. The image reading apparatus uses this method to raise the automatic recognition ratio of an original image.

After detecting an edge of an original image, the image reading apparatus verifies the edge detection result based on the most reliable side in detected sides of the original. In case the detection result is doubtful, skips extraction or inclination correction of the image.

Figure 11:
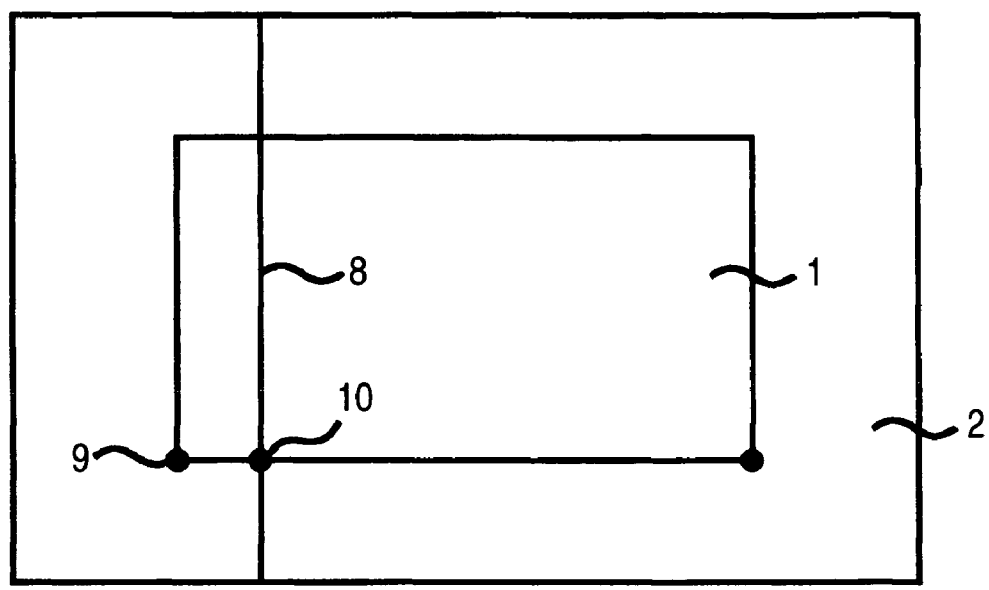
FIG. 11 is an explanatory drawing of the verification processing of the edge detection result.

For example, as shown in FIG. 11, assuming that the most reliable side is the bottom side, a straight line 8 recognized as the left side is determined as a doubtful detection result since coordinates of an intersect point 10 of the straight line recognized as the left side and the bottom side does not match coordinates of the leftmost end 9 of the bottom side.

In case such an erroneous detection (a doubtful detection result) is determined, the original image (an area of the original) is not extracted but the extra image data including the overall view of the original image is output as it is. This prevents a case where the user has inadvertently extracted a target image and lost necessary image data thus making it impossible to restore the image data at a later time.

Figure 9:
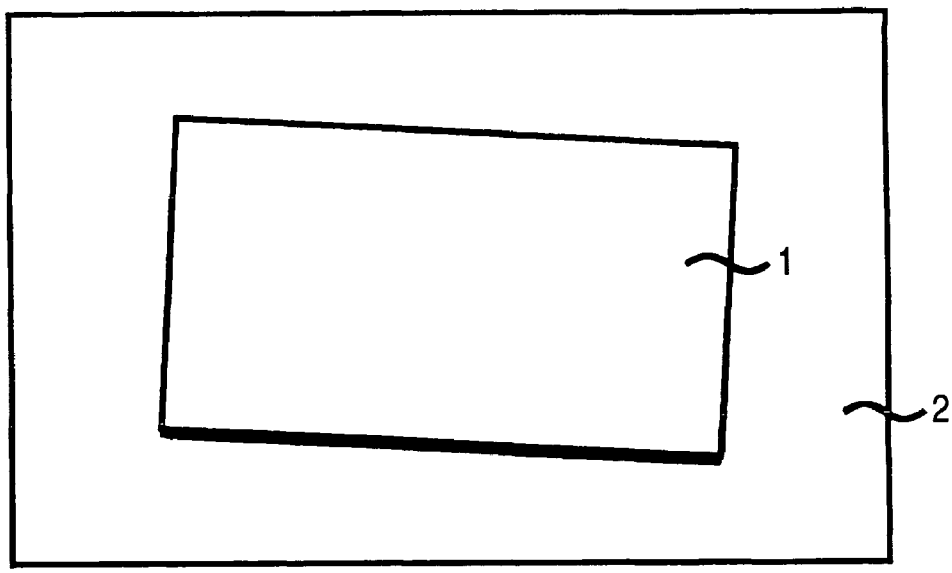
FIG. 9 is an example 1 of the most reliable side.

In a method for determining the most reliable side, the bottom side may have a dark shadow caused by light irradiating the original as shown in FIG. 9 in which case the bottom side is determined as the most reliable side.

Figure 10:
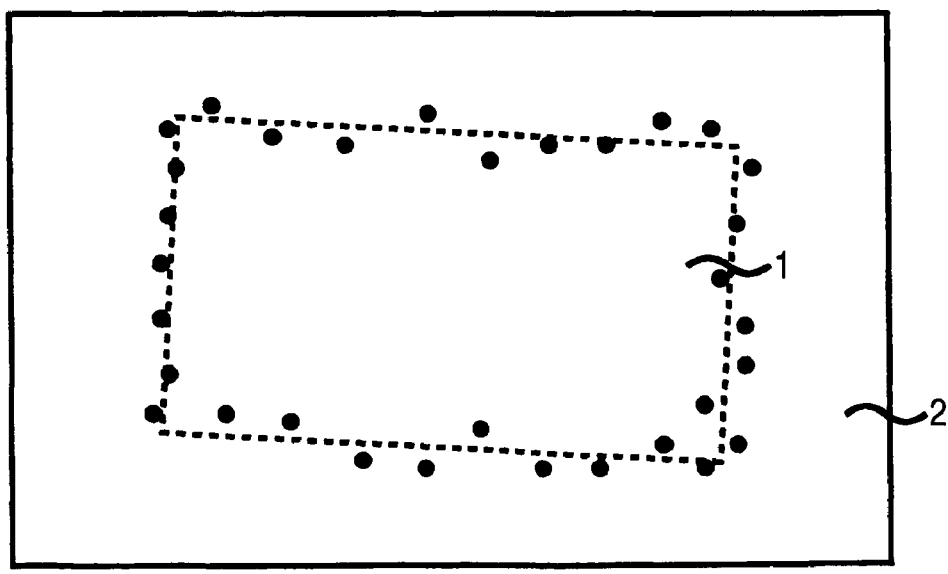
FIG. 10 is an example 2 of the most reliable side.

Alternatively, it is possible to determine as the most reliable side a side where points detected by edge detection are arranged most linearly, that is, the left side in FIG. 10.

Figure 12:
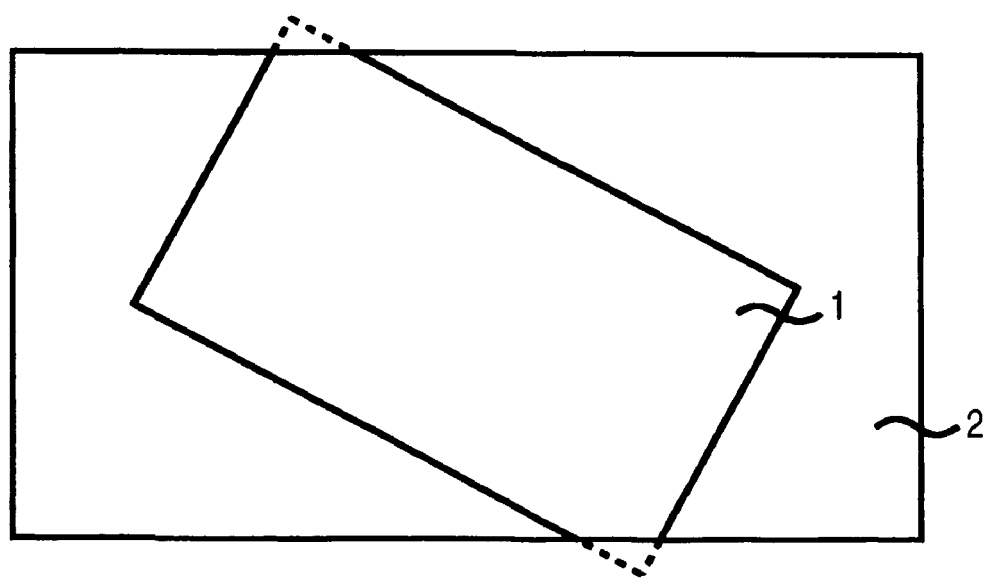
FIG. 12 is an explanatory drawing of processing assumed when part of an image is missing.

In case the original exceeds an area read by the image reader thus resulting in a missing portion of an image, for example, in case the original is read while it is substantially tilted as shown in FIG. 12, reference data is generated based on an area where overall width of the image is not the back pad. Namely, the reference data is generated based on the area including not only the back pad but also the original. At this time, the reference data corresponding to an area that is not back pad but the original has a lower reliability, however, it is possible to detect the edge of the original by performing edge detection and image processing such as collinear approximation to a result of the edge detection. Naturally, the edge detected by use of the unreliable reference date is not reliable. In addition, it is assumed from calculation that the original exceeds the reading area by this edge detection and the image processing. In such a case, a message is displayed on a screen or the like so as to prompt the user to reattempt original reading.

The e-Document Law requests that the overall view of the original image be included. The inventive image reading apparatus previously prevents a case where the user inadvertently stores image data not including the overall view of the original image and has trouble with using the data at a later time.

The invention provides the following advantages.

In case a white back pad for an original is used to set white reference for white correction or shading correction, it is possible to correctly perform extraction or inclination correction of an original even in case the background color of the original is white and a difference in contrast with the back pad is small.

In this practice, the image reading apparatus may be downsized or its mechanism/control may be simplified, or the image reading apparatus may be produced at a lower cost without a need to provide special contrivance such as a black/white switching mechanism to the back pad for an original.

What is claimed is:

1. An image reading apparatus, comprising:
   an image reader, operable to read an image corresponding to an original and a back pad, the original being placed on the back pad so that outside of the original contains an area extending in overall width of the back pad, the area being an area in which the original is not disposed;
   a first data generator, operable to generate first image data based on the image;
   a second data generator, operable to generate second image data based on a part of the image corresponding to the area, the second image data being a matrix average value of gradation values of predetermined pixels of the part of the image;
   a first processor, operable to compare the first image data with the second image data pixel by pixel so as to generate first edge information; and
   a detector, operable to detect an edge of the original based on the first edge information.

2. The image reading apparatus according to claim 1, further comprising:
   a second processor, operable to perform image processing to the image so as to clarify contrast difference between the original and the back pad.

3. The image reading apparatus according to claim 1, further comprising
   a feeder, operable to feed the original;
   a mechanical sensor, operable to be brought in contact with the fed original so as to detect the edge of the original; and
   a second processor, operable to generate second edge information based on the edge detected by the mechanical sensor,
   wherein the detector detects the edge of the original based on the first and second edge information.

4. The image reading apparatus according to claim 1, wherein
   the image corresponds to both sides of the original which are simultaneously read by the image reader,
   the first edge information includes second edge information associated with one of the both sides of the original and third edge information associated with the other one of the both sides of the original, and
   the detector detects the edge of the original based on at least one of the first edge information and the second edge information.

5. The image reading apparatus according to claim 1, further comprising:

a second processor, operable to detect a most linear side in the edge of the original including four sides, and to verify the edge of the original detected by the first detector based on the most linear side so as to generate verification information; and a third processor, operable to determine whether the edge of the original is more linear than a predetermined threshold based on the verification information, wherein in a case where the edge of the original is not more linear than the predetermined threshold, image processing is not performed to the image.

6. An image reading apparatus, comprising:

an image reader, operable to read an image including a first image corresponding to a first area in which an original is disposed and a second image different from the first image, the second image corresponding to a second area in which the original is not disposed;

a generator, operable to generate first image data based on the image and second image data based on the second image, the second image data being a matrix average value of gradation values of predetermined pixels of the second image; and a detector, operable to detect an edge of the original based on the first image data and the second image data.

7. The image reading apparatus according to claim 6, further comprising a processor, operable to decide whether the first area contains the whole of the original, wherein in a case where the first area does not contain the whole of the original, a user is notified of an error with a message.

8. A method of detecting an edge of an original placed on a back pad, the method comprising:

reading an image corresponding to the original and the back pad, the original being placed on the back pad so that outside of the original contains an area extending in overall width of the back pad, the area being an area in which the original is not disposed;

generating first image data based on the image;

generating second image data based on a part of the image corresponding to the area, the second image data being a matrix average value of gradation values of predetermined pixels of the part of the image;

comparing the first image data with the second image data pixel by pixel so as to generate edge information; and detecting the edge of the original based on the edge information.

9. The image reading apparatus according to claim 1, further comprising a second processor, operable to decide whether the first area contains the whole of the original, wherein in a case where the first area does not contain the whole of the original, a user is notified of an error with a message.

* * * * *